United States Patent Office 3,044,917
Patented July 17, 1962

3,044,917
WAX COMPOSITION
William J. Stout, Wilmington, Del., and Seymour W. Ferris, Chester, and John D. Tench, Prospect Park, Pa., assignors to Sun Oil Company, Philadelphia, Pa., a corporation of New Jersey
No Drawing. Filed Jan. 19, 1960, Ser. No. 3,236
8 Claims. (Cl. 154—50)

This invention relates to a novel wax composition. It particularly relates to a hydrocarbon wax composition containing a major portion of microcrystalline wax and a minor portion of a specific paraffin wax, the composition having high adhesive quality.

One of the most important microcrystalline waxes of commerce is the "laminating" wax which is used in whole or in part as the adhesive in preparing laminations. Specifically, the laminating wax may be employed for binding sheets of fibrous materials, such as paper bond, paper, and regenerated cellulose, to form a sheet material, such as a container wall, consisting of two or more sheets of material adhered together by a film of wax intercalated therebetween. Laminating wax may also be used as a coating compound for materials to provide a moisture and moisture vapor barrier such as for containers for packaging foods.

An object of the present invention is to provide a novel hydrocarbon laminating wax having microcrystalline wax and paraffin wax as the essential components. Another object is to provide a wax composition consisting of microcrystalline wax and paraffin wax but having adhesive qualities substantially equivalent to the microcrystalline laminating wax. Still another object is to provide a container formed from cellulosic or fibrous sheets adhered together with the wax composition of the invention.

The successful preparation of the wax composition of the invention requires that the paraffin wax component be of a specific type. In U.S. Patent No. 2,624,501 to S. W. Ferris, one of the co-inventors of this invention, there is described and claimed a paraffin wax, having specific properties, which is especially suitable for coating fibrous sheet materials and containers such as milk containers. The paraffin wax of the present invention is a component of the paraffin wax claimed by Ferris Patent No. 2,624,501. The successful practice of this invention requires that the paraffin wax component have the following properties: melting point of from 118° F. to 130° F. (ASTM, D–938); refractive index @ 212° F. from 1.4250 to 1.4300; penetration @ 77° F. from 25 to 50 (ASTM, D–5–25); viscosity, Saybolt Universal seconds, @ 210° F. from 40 to 44 (ASTM, D–446–39); and boiling range of the 5% through 95% fraction of from 400° F. to 600° F. @ 2 mm. Hg pressure absolute.

The present invention is based on the discovery that up to 50 percent by weight of the above-described paraffin wax can be added to microcrystalline wax to form a laminating wax composition having an adhesion value substantially the same as the microcrystalline wax alone. Thus, the invention provides an economical way of increasing the supply of laminating wax to industry. However, a paraffin wax which does not have properties essentially within the above-stated ranges does not produce a satisfactory laminating wax as defined by this invention.

The microcrystalline wax component may be obtained by any of the methods known to the art. One especially suitable method is described and claimed in U.S. Patent No. 2,783,183. In general, the method of obtaining microcrystalline wax with "laminating" quality is as follows: A slack wax having from about 20 percent to about 50 percent oil is subjected to vacuum distillation to form a plurality of fractions. The desired fraction is dissolved in a hot solvent, such as a mixture of methyl ethyl ketone and benzene, chilled at one desired temperature and the precipitated wax separated by, say, filtration. The filtrate from this first step is further chilled to another desired lower temperature, and the precipitated wax separated and recovered. This sequence is repeated until the desired wax fraction is obtained.

For example, a microcrystalline wax suitable for use in the composition of this invention is prepared as follows: Slack wax containing about 30 percent oil, obtained from the dewaxing of lubricating oils, is continuously vacuum distilled at 650° F. into two distillate fractions, one being removed at about 420° F. @ 6 mm. Hg pressure, and the other at about 590° F. @ 25 mm. Hg pressure. These low boiling fractions constitute 68 percent of the total charge. The high boiling residual fraction constitutes 32 percent of the total charge and is used for the recovery of the desired microcrystalline wax. This high boiling residual fraction is dissolved in 3.5 parts of a hot (150° F.) solvent mixture comprising 53 percent methyl ethyl ketone and 47 percent benzene. The resulting wax solution is cooled to 93° F., diluted with 5.5 parts of solvent, filtered (or centrifuged) to remove the precipitated wax, and the wax washed with 4 parts of solvent. The filtrate from the initial filtration was further cooled to 58° F., diluted with 6 parts of solvent, filtered, and washed with 4 parts of solvent. The wax product finally obtained, after solvent removal has an adhesion value between 30 and 120 grams pull per 2 inch width and is designated herein as "microcrystalline laminating wax."

It is understood that the above-recited method of obtaining the microcrystalline laminating wax is only illustrative and any other means of obtaining a micro-crystalline wax suitable for laminating purposes is equally applicable to this invention. The invention embodies the use of a microcrystalline laminating wax as one component of a wax composition and does not embody any particular method of obtaining the microcrystalline wax component. The preparation of the paraffin wax constituent of the present invention is advantageously accomplished substantially as follows: A slack wax obtained as a by-product from the dewaxing of lubricating oils, and which contains about 30 percent oil, is subjected to vacuum distillation at 10 mm. Hg pressure absolute and about 650° F. to produce two major distillate fractions. The lighter boiling fraction will have a boiling range of 460 to 470° F. @ 2 mm. Hg and will represent about 2 to 40 percent yield based on charge. The heavier boiling fraction will have a boiling range of 550 to 570° F. @ 2 mm. Hg and will represent about 40 to 64 percent yield based on charge. This heavier boiling fraction is dissolved in a hot solvent composed of 65 percent methyl ethyl ketone and 35 percent benzene at 165° F. to 195° F. and slowly cooled to a temperature of from 75° F. to 80° F. The precipitated wax is separated such as by filtering or centrifuging. The resulting filtrate is then cooled further to a temperature of from 25° F. to 30° F. and the precipitated wax recovered such as by filtering or centrifuging. This latter wax, following solvent removal and having previously-described properties, forms the paraffin wax component of the wax composition of the present invention.

The solvent designated in the methods of preparing the wax components may be any of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, and hexane, or alcohols such as propyl or the heptyl alcohols.

The incorporation of the paraffin wax in the microcrystalline wax may be by any convenient means such as by admixing the waxes in the molten state to obtain a homogeneous blend.

The laminating wax compositions of the invention are illustrated in the following examples wherein all percentages shown are weight percent unless otherwise specified.

*Example 1*

The paraffin wax component was prepared according to the above-described method and had the following properties: Melt point of 126° F., penetration at 77° F. of 38, viscosity (SUS) at 210° F. of 42.0, and an adhesion value of 18. This paraffin wax was added in the molten state, in varying amounts to several samples of molten microcrystalline waxes which were prepared in the previously-described manner, with agitation to secure a homogeneous blend on cooling. The following table illustrates the results:

| Percent Micro | Percent Paraffin | Melt Pt., ° F. | Pen. at 110° F. | Vis. at 210° F. | Adhesion, Gms./2 in. |
|---|---|---|---|---|---|
| 100 |    | 153 | 71  | 71.5 | 49 |
| 75  | 25 | 148 | 105 | 61.6 | 57 |
| 50  | 50 | 143 | 156 | 52.2 | 31 |
| 25  | 75 | 135 | 214 | 45.2 | 18 |
| 100 |    | 152 | 69  | 70.0 | 35 |
| 75  | 25 | 148 | 97  | 59.7 | 41 |
| 50  | 50 | 140 | 123 | 52.0 | 36 |
| 25  | 75 | 132 | 209 | 46.0 | 13 |
| 100 |    | 151 | 75  | 79.4 | 62 |
| 75  | 25 | 147 | 114 | 64.3 | 61 |
| 50  | 50 | 140 | 148 | 54.9 | 45 |
| 25  | 75 | 131 | 200 | 47.1 | 16 |

Thus, as shown by the data, the blends are of lower melting point and lower viscosity but, most important, with compositions up to 50 percent paraffin wax, the adhesion values of the blends are substantially the same as the microcrystalline wax component alone.

*Example 2*

Another portion of the paraffin wax component from Example 1 was blended with a different microcrystalline wax with the following result:

| Percent Micro | Percent Paraffin | Adhesion, Gm/2 in. |
|---|---|---|
| 100 | 0  | 59 |
| 98  | 2  | 60 |
| 95  | 5  | 60 |
| 90  | 10 | 57 |
| 85  | 15 | 55 |
| 80  | 20 | 59 |
| 75  | 25 | 53 |

Thus, the above data indicate, in conjunction with Example 1, that the adhesion value of the wax blend remains substantially the same value as the microcrystalline wax component for the range of paraffin wax concentrations between about 2 percent and about 50 percent. It follows that wax compositions containing less than 2 percent paraffin wax will have adhesion values essentially the same as the microcrystalline wax. Above 50 percent paraffin wax it is apparent that the adhesion values of the blends fall off rapidly (as in Example 1).

*Example 3*

Further, three other paraffin wax samples were obtained which had physical properties outside the ranges stipulated for the paraffin wax component of the invention as follows:

|  | Wax A | Wax B | Wax C |
|---|---|---|---|
| Sun Oil Designation | 3,420 | 4,412 | 5,512 |
| Melt point, ° F. | 134 | 143 | 153 |
| R.I. @ 212° F. | 1.4200 | 1.4227 | 1.4250 |
| Penetration @ 77° F. | 10 | 9 | 9 |
| Viscosity @ 210° F. | 38.1 | 40.3 | 44.2 |

These other paraffin waxes were blended at 25 percent paraffin wax concentration with a microcrystalline wax prepared as previously described with the following results:

Adhesion, gm./2 in.
Micro (Sun Oil No. 5825) _____ 84
Wax A Blend _____ 44
Wax B Blend _____ 48
Wax C Blend _____ 52

From the above, it is seen that paraffin waxes having properties outside the stipulated ranges are unsuitable for the practice of the invention. Note that the 25 percent paraffin wax blend, in all cases, had an adhesion value of from 30 to 40 units below the microcrystalline wax adhesion value. On the other hand, using the paraffin wax component of the invention, it is noted that the blends, in Example 1, containing at least 25 percent paraffin wax, had adhesion values of not more than 20 units below the microcrystalline wax value. It is particularly noted from the data that the blends, in Examples 1 and 2 containing up to 25 percent paraffin wax had adhesion values almost identical to the adhesion value of the microcrystalline wax component.

*Example 4*

To further demonstrate the invention, a slack wax was processed to produce the paraffin wax described and claimed in U.S. Patent No. 2,624,501. This paraffin wax was blended 25 percent with a microcrystalline wax. The adhesion value of the blend was 15.

*Example 5*

The paraffin wax of Example 4 was modified in that a paraffin wax fraction having properties required by the invention was not a part thereof. This paraffin wax was blended 25 percent with a microcrystalline wax. The adhesion value of the blend was 13.

*Example 6*

A paraffin wax component having properties required by the present invention and prepared from the same charge stock as the fractions used in Examples 4 and 5 was blended 25 percent with a microcrystalline wax. The adhesion value of the blend was 46.

In each of the last three examples, the microcrystalline wax component had an adhesion value of about 49. Therefore, it is clear from the data that the other paraffin wax components from the same charge stock are not suitable for the practice of this invention. Note in Example 6 that when the paraffin wax component of the invention was blended in 25 percent quantity with a microcrystalline wax having an adhesion value of 49, the resulting blend had an adhesion value of 46, which is substantially the same value as the microcrystalline wax alone.

The adhesion test used herein was performed as follows: Two strips of glassine paper, 2 inches by 6 inches, were laminated with the wax under test by pressing them mildly on a hot plate at a temperature just above the melting point of the wax. The load was adjusted to about 8 pounds of wax per ream of laminate, evenly distributed between the strips. This laminate was held at 73° F. in an atmosphere of 50 percent relative humidity for one hour before testing. Adhesion is the grams pull per 2 inch width required to separate the strips by peeling.

Laminating waxes of the microcrystalline type will have adhesion values, measured as described above, of from 30 to 120. Typical samples of microcrystalline waxes were tested and the following adhesion values were obtained: 35, 49, 59, 62, 74, 84, 89, 99, and 117. On the other hand, paraffin waxes have adhesion values from about 6 to 18. Thus, it was quite unexpected that a paraffin wax, for example, with an adhesion value of 18 could be blended as much as 25 percent by weight with a microcrystalline wax having an adhesion value of 59 and produce a wax blend having an adhesion value of 53.

The laminating wax compositions of the present invention are useful for all applications heretofore restricted to microcrystalline waxes. For example, a wax blend consisting of from 50 to 98 percent by weight, microcrystalline wax having an adhesion value from 30 to 120 grams pull per two inch width and a paraffin wax having a melting point of from 118° F. to 130° F.; refractive index @ 212° F. from 1.4250 to 1.4300; penetration @ 77° F. from 25 to 50; viscosity, SUS, @ 210° F. from 40 to 44; and a boiling range of the 5 percent through 95 percent fraction of from 400° F. to 600° F. @ 2 mm. Hg, may be employed for binding sheets of cellulosic material, such as a container wall. The container wall consists of two or more sheets of the cellulosic material adhered together by a film of the wax blend of the invention intercalated therebetween.

In addition, from the foregoing examples, wax compositions containing from 25 percent to 50 percent by weight paraffin wax prepared according to the present invention with the remainder being essentially microcrystalline wax will have, typically, the following characteristics: Melt point between 140° F. and 148° F., penetration @ 110° F. of from 97 to 156, viscosity @ 210° F. of from 62 to 64, and an adhesion value of from 31 to 61.

We claim:

1. A wax composition consisting essentially of from 50 to 98 percent by weight of a hydrocarbon microcrystalline wax derived from petroleum and having an adhesion value of from 30 to 120, and of from 50 to 2 percent by weight of a hydrocarbon paraffin wax derived from petroleum and having a melting point of from 118° F. to 130° F., a refractive index @ 212° F. of from 1.4250 to 1.4300, a penetration @ 77° F. of from 25 to 50, a viscosity @ 210° F. of from 40 to 44, and a boiling range of the 5 percent through 95 percent volume fraction of from 400° F. to 600° F. @ 2 mm. Hg.

2. A laminating wax composition according to claim 1 wherein said laminating wax composition has an adhesion value of not more than 20 units below the adhesion value of the microcrystalline wax component alone.

3. A laminating wax composition consisting essentially of from 50 to 98 percent by weight of a hydrocarbon microcrystalline wax derived from petroleum and having a penetration at 110° F. of from 69 to 75 a viscosity @ 210° F. of from 70 to 79, and an adhesion value of from 35 to 62, and of from 50 to 2 percent by weight of a hydrocarbon paraffin wax derived from petroleum and having a melting point of from 118° F. to 130° F., a refractive index @ 212° F. of from 1.4250 to 1.4300, a penetration @ 77° F. of from 25 to 50, a viscosity @ 210° F. of from 40 to 44, and a boiling range of the 5 percent through 95 percent volume fraction of from 400° F. to 600° F. @ 2 mm. Hg.

4. A laminating wax composition according to claim 3 wherein said laminating wax composition has an adhesion value of not more than 20 units below the adhesion value of the microcrystalline wax component alone.

5. A hydrocarbon laminating wax derived from petroleum having a melting point between 140° F. and 148° F., a penetration @ 110° F. of from 97 to 156, a viscosity @ 210° F. of from 52 to 64, and an adhesion value of from 31 to 61, said wax consisting essentially of from 25 to 50 percent by weight paraffin wax with the remainder being microcrystalline wax.

6. A laminating wax composition consisting essentially of a hydrocarbon microcrystalline wax derived from petroleum and having an adhesion value of from 30 to 120, and at least 25 percent by weight of a hydrocarbon paraffin wax derived from petroleum and having a melting point of from 118° F. to 130° F., a refractive index @ 212° F. of from 1.4250 to 1.4300, a penetration @ 77° F. of from 25 to 50, a viscosity @ 210° F. of from 40 to 44, and a boiling range of the 5 percent through 95 percent volume fraction of from 400° F. to 600° F. @ 2 mm. Hg, said laminating wax composition having an adhesion value of not more than 20 units below the adhesion value of the microcrystalline wax component alone.

7. Fibrous sheets of cellulosic material adhered together by a laminating wax film, said film consisting essentially of from 50 to 98 percent by weight of a hydrocarbon microcrystalline wax derived from petroleum and having an adhesion value from 30 to 120 grams pull per two inch width, and of from 50 to 2 percent by weight of a hydrocarbon paraffin wax derived from petroleum and having a melting point of from 118° F. to 130° F., a refractive index @ 212° F. of from 1.4250 to 1.4300, a penetration @ 77° F. of from 25 to 50, a viscosity @ 210° F. of from 40 to 44, and a boiling range of the 5 percent through 95 percent volume fraction of from 400° F. to 600° F. @ 2 mm. Hg.

8. Fibrous sheets of cellulosic material adhered together by a laminating wax film, said film consisting essentially of microcrystalline wax derived from petroleum and having an adhesive value of from 30 to 120, and at least 25 percent of a hydrocarbon paraffin wax derived from petroleum and having a melting point of from 118° F. to 130° F., a refractive index @ 212° F. of from 1.4250 to 1.4300, a penetration @ 77° F. of from 25 to 50, a viscosity @ 210° F. of from 40 to 44, and a boiling range of the 5 percent through 95 percent volume fraction of from 400° F. to 600° F. @ 2 mm. Hg, said laminating wax film having an adhesion value of not more than 20 units below the adhesion value of the microcrystalline wax component alone.

References Cited in the file of this patent

UNITED STATES PATENTS

| | | |
|---|---|---|
| 2,399,521 | Tyler | Apr. 30, 1946 |
| 2,443,221 | Bergstein | June 15, 1948 |
| 2,730,452 | Johnston et al. | Jan. 10, 1956 |
| 2,773,812 | Tench | Dec. 11, 1956 |
| 2,847,367 | Walsh et al. | Aug. 12, 1958 |
| 2,885,340 | Tench | May 5, 1959 |